United States Patent [19]
Bordignon

[11] Patent Number: 5,992,200
[45] Date of Patent: Nov. 30, 1999

[54] APPARATUS FOR BENDING LAMINATIONS IN GENERAL AND COMPUTER DISKETTE SLIDING COVERS IN PARTICULAR

[75] Inventor: Abramo Bordignon, Senago, Italy

[73] Assignee: A.T.B. S.p.A., Senago, Italy

[21] Appl. No.: 08/982,393

[22] Filed: Dec. 2, 1997

[30] Foreign Application Priority Data

Dec. 12, 1996 [IT] Italy ................................. MI96A2616

[51] Int. Cl.$^6$ ........................................................ B21D 9/08
[52] U.S. Cl. ............................................................. 72/212
[58] Field of Search .......................... 72/212, 213, 215, 72/383, 389.2, 453.12, 414, 381, 382

[56] References Cited

U.S. PATENT DOCUMENTS

| | | | |
|---|---|---|---|
| 419,156 | 1/1890 | McGiehan | 72/212 |
| 2,274,828 | 3/1942 | Finzel | 72/212 |
| 3,613,427 | 10/1971 | Haddon | 72/212 |
| 4,619,126 | 10/1986 | Kolecki | 72/236 |
| 5,253,502 | 10/1993 | Poletti | 72/213 |
| 5,501,094 | 3/1996 | Mizuta et al. | 72/389.2 |

FOREIGN PATENT DOCUMENTS

| | | |
|---|---|---|
| 727 783 | 8/1996 | European Pat. Off. . |
| 20 50 348 | 4/1972 | Germany . |
| 36 29 270 | 3/1987 | Germany . |
| 93 11888 | 6/1993 | WIPO . |

OTHER PUBLICATIONS

Patent Abstracts Of Japan vol. 6, No. 97 (M–134), Jun. 5, 1982 & JP 57 032826 A (Toyota Motor Corp), Feb. 22, 1982, * abstract*.

*Primary Examiner*—Rodney Butler
*Attorney, Agent, or Firm*—Guido Modiano; Albert Josif

[57] ABSTRACT

An apparatus for bending metallic and nonmetallic laminations in general and sliding covers for computer diskettes in particular, which has the particularity that it comprises a forming die provided with a lower base and a movable upper part. The lower base constitutes the forming punch and centering elements for positioning the lamination to be bent, while the movable upper part supports a presser adapted to engage the forming punch in order to retain the lamination in position and at least one bending roller which can engage the surface of the lamination without relative sliding in order to perform bending in abutment against the punch.

10 Claims, 5 Drawing Sheets

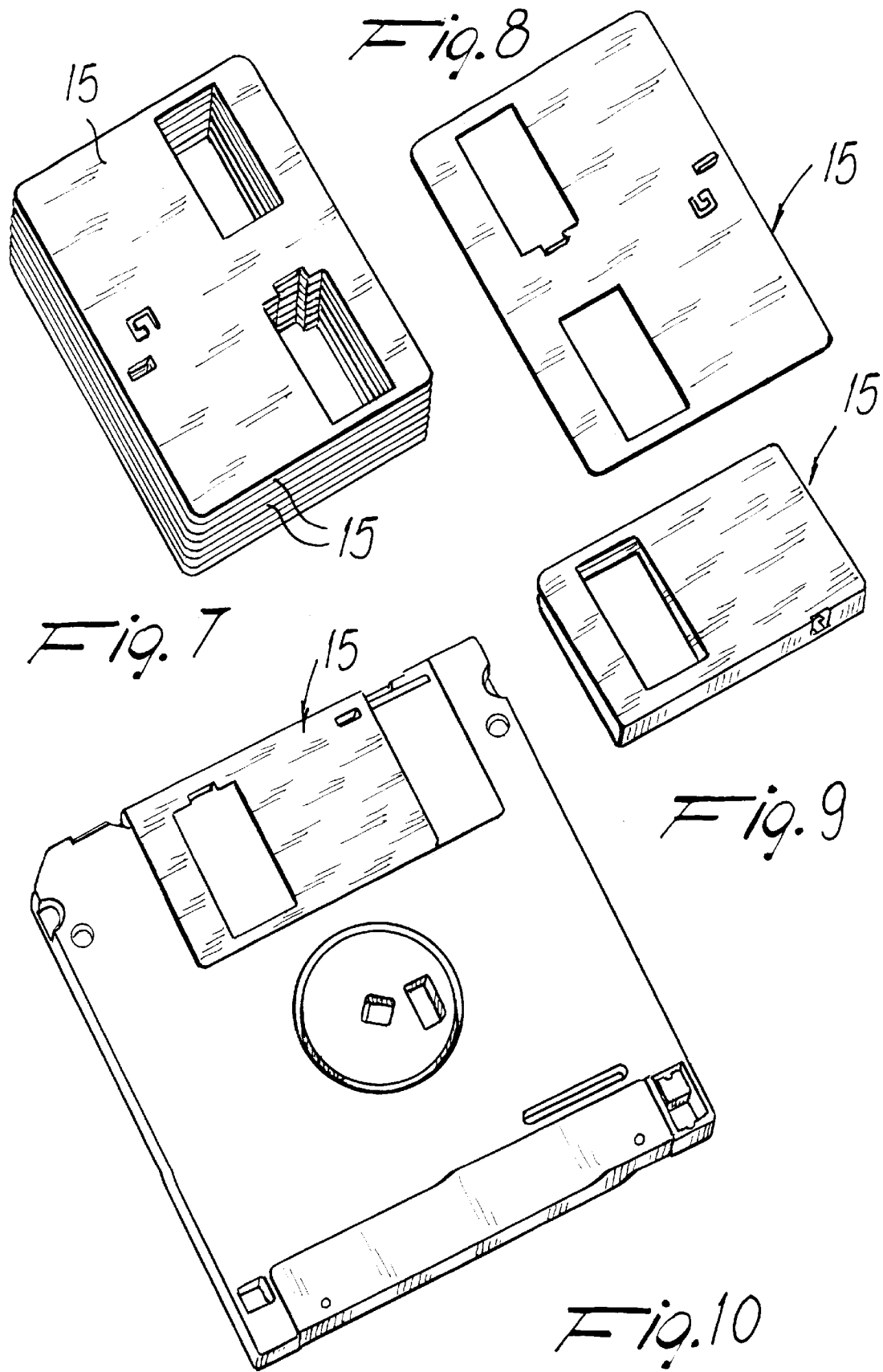

APPARATUS FOR BENDING LAMINATIONS IN GENERAL AND COMPUTER DISKETTE SLIDING COVERS IN PARTICULAR

BACKGROUND OF THE INVENTION

The present invention relates to an apparatus for bending metallic and nonmetallic laminations in general and sliding covers for computer diskettes in particular.

Bending machines provided by means of bending blades or oscillating bending tables are normally used to bend metallic laminations; their common characteristic is that they produce a relative sliding between the lamination being bent and the bending element, so that damage or surface scoring can occur on the lamination.

This limitation is particularly felt for example in the production of sliding covers for computer diskettes. When the sliding cover is supplied to the diskette manufacturer, it must be already bent in its U-shaped configuration, entailing consequent considerable bulks and useless space occupation during shipping, since the sliding covers are shipped already bent, with a consequent limited utilization of space.

SUMMARY OF THE INVENTION

The aim of the present invention is to eliminate the above drawbacks, providing an apparatus for bending metallic and nonmetallic laminations in general and sliding covers for computer diskettes in particular, which allows to bend the lamination without causing any surface damage even if the lamination has previously undergone a coating treatment or the like.

Within the scope of this aim, a particular object of the invention is to provide an apparatus which by the repetitive nature of the operations that can be performed and to the lack of surface damage, allows to bend the sliding covers in-line with respect to diskette assembly machines, so that it is possible to supply diskette manufacturers with the laminations in a flat configuration.

Another object of the present invention is to provide an apparatus which thanks to its particular constructive characteristics is capable of giving the greatest assurances of reliability, bending angle setting and safety in use.

This aim, these objects and others which will become apparent hereinafter are achieved by an apparatus for bending metallic and nonmetallic laminations in general and sliding covers for computer diskettes in particular, according to the present invention, characterized in that it comprises a forming die provided with a lower base and a movable upper part, said lower base constituting the forming punch and centering elements for positioning a lamination to be bent, said movable upper part supporting a presser which is adapted to engage said forming punch in order to retain said lamination in position and at least one bending roller which can engage a surface of said lamination without relative sliding in order to perform bending in abutment against said punch.

BRIEF DESCRIPTION OF THE DRAWINGS

Further characteristics and advantages of the present invention will become apparent hereinafter from the following detailed description of a preferred but not exclusive embodiment of an apparatus for bending laminations in general and computer diskette sliding covers in particular, illustrated only by way of non-limitative example in the accompanying drawings, wherein:

FIG. 7 is a purely exemplifying view of a plurality of laminations which can be used to obtain computer diskette sliding covers;

FIG. 8 is a schematic plan view of a lamination;

FIG. 9 is a view of the resulting sliding cover;

FIG. 10 is a view of the sliding cover applied to a diskette.

DESCRIPTION OF THE PREFERRED EMBODIMENTS

Figure 1:
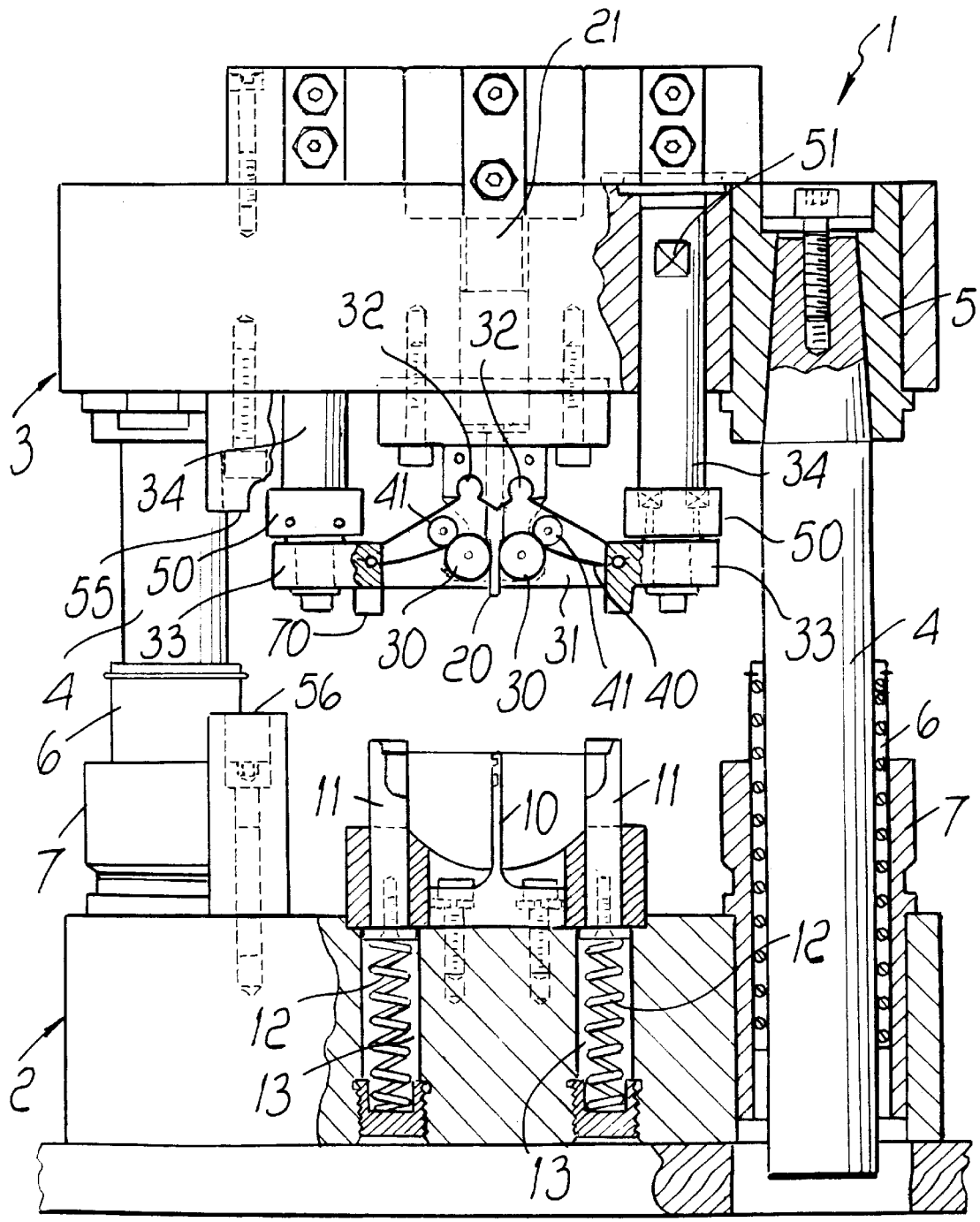
FIG. 1 is a partially sectional schematic view of the apparatus according to the present invention, with the upper movable part spaced from the lower base.
Figure 2:
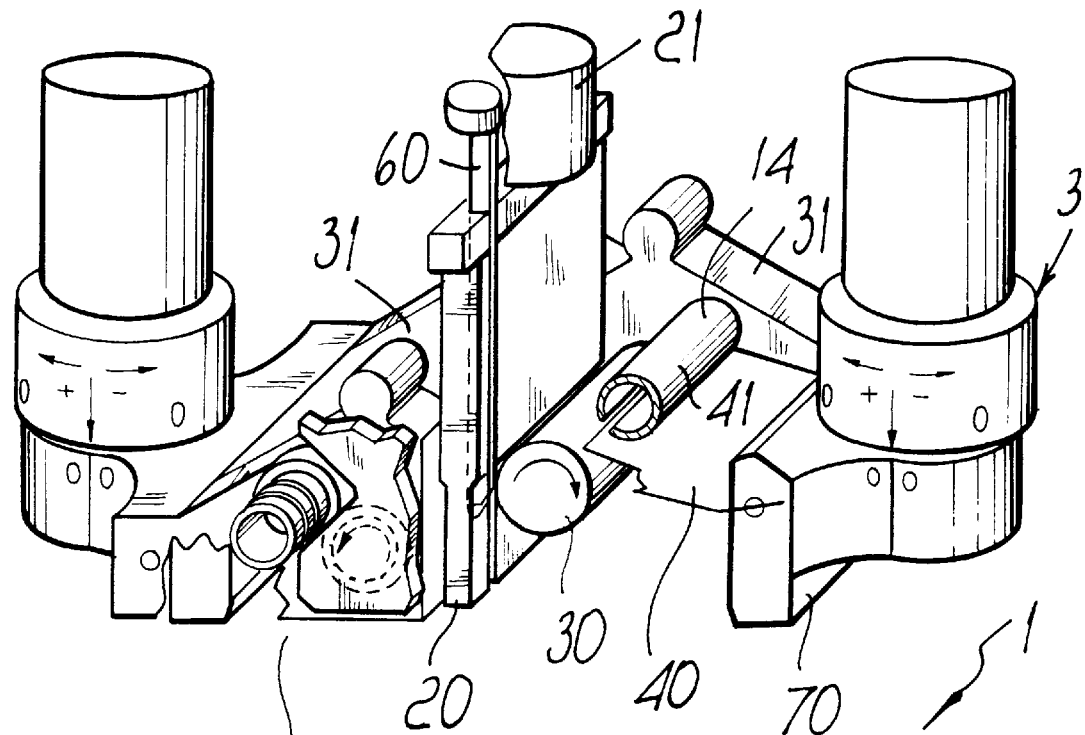
FIG. 2 is a schematic perspective view of the lower base and of the upper part.
Figure 2:
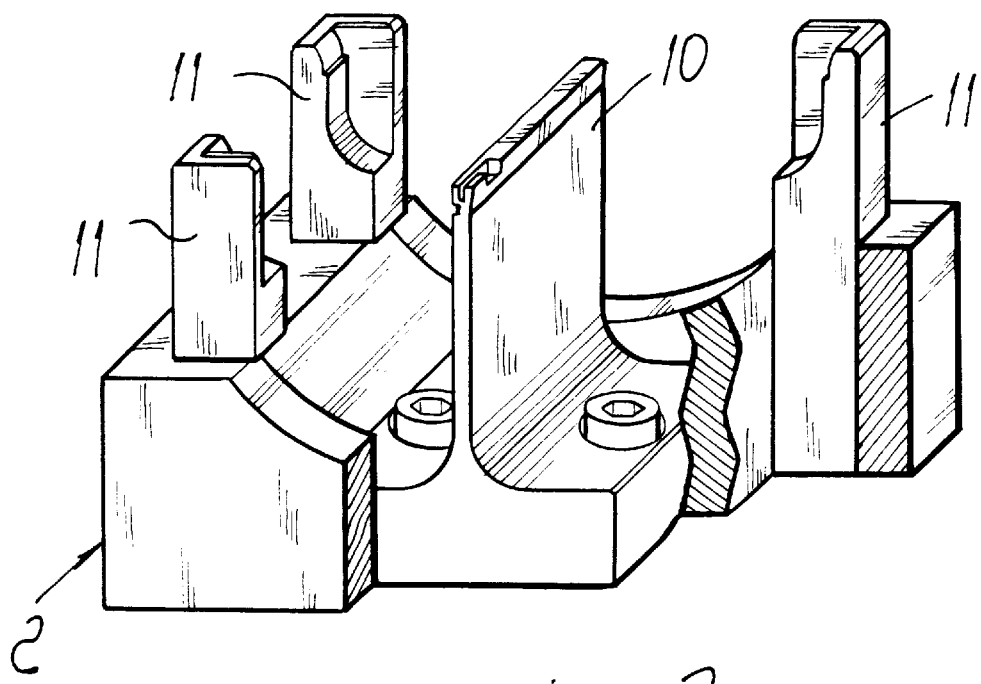

With reference to the above figures, the apparatus for bending metallic and nonmetallic laminations in general and computer diskette sliding covers in particular, according to the present invention, comprises a forming die, generally designated by the reference numeral 1, which is composed of two separate elements and specifically a lower base 2 and an upper movable part 3.

The upper movable part 3 is connected to the lower base 2 by two posts 4 which are connected, in an upward region, to guiding bushes 5 which are associated with the upper part 3 and slide in cages of ball bearings 6 formed in bush-shaped sleeves 7 associated with the lower base 2.

The lower base 2 forms a punch 10 whereat centering elements are provided, for example, by means of retracting posts 11 which can move in contrast with springs 12 accommodated in seats 13 formed on the lower part.

In this manner, the centering elements allow to correctly position the lamination 12 before bending it.

The upper part 3 supports a presser 20 which is actuated by a central cylinder 21 which applies a chosen pressure in order to keep the lamination 12 in position when the presser 20 engages against the punch 10.

The central cylinder 21 is meant to apply pressure to all the corresponding surface of the lamination 12 in order to lock it against the forming punch 10 with a pressure which remains constant over the entire active stroke and can be easily adjusted by operating the pressure regulator.

In the case of the production of diskette sliding covers, two bending rollers 30 to the sides of the presser 20 are provided; said rollers are supported by side walls 31 which are pivoted in an upward region at 32 and are joined, at their free end, by blocks 33 which are associated with double-acting lateral pneumatic cylinders 34 which have the purpose of positioning the blocks 33 that join the side walls 31 and consequently of adjusting the position of the bending rollers 30.

The bending rollers 30 can rotate about their own axis, as will become apparent hereinafter; a doctor 40 engages on the rollers 30 and has the purpose of removing any material that might deposit itself on the cylinders; said material is then removed by suction elements 41 which have the purpose of keeping the bending rollers 30 always perfectly clean.

A precision matching element, designated by the reference numeral 70, is also provided in the upper part 3, can be set by means of the adjustable rings 50, and engages between the centering posts 11.

During practical operation, when the upper part 3 is located at the upper stroke limit, the lateral cylinders 34 are retracted and the adjustment rings 50 and spacers 51 keep the blocks 33 that support the bending rollers 30 spaced from each other and slightly spaced from the presser 20.

Figure 3:
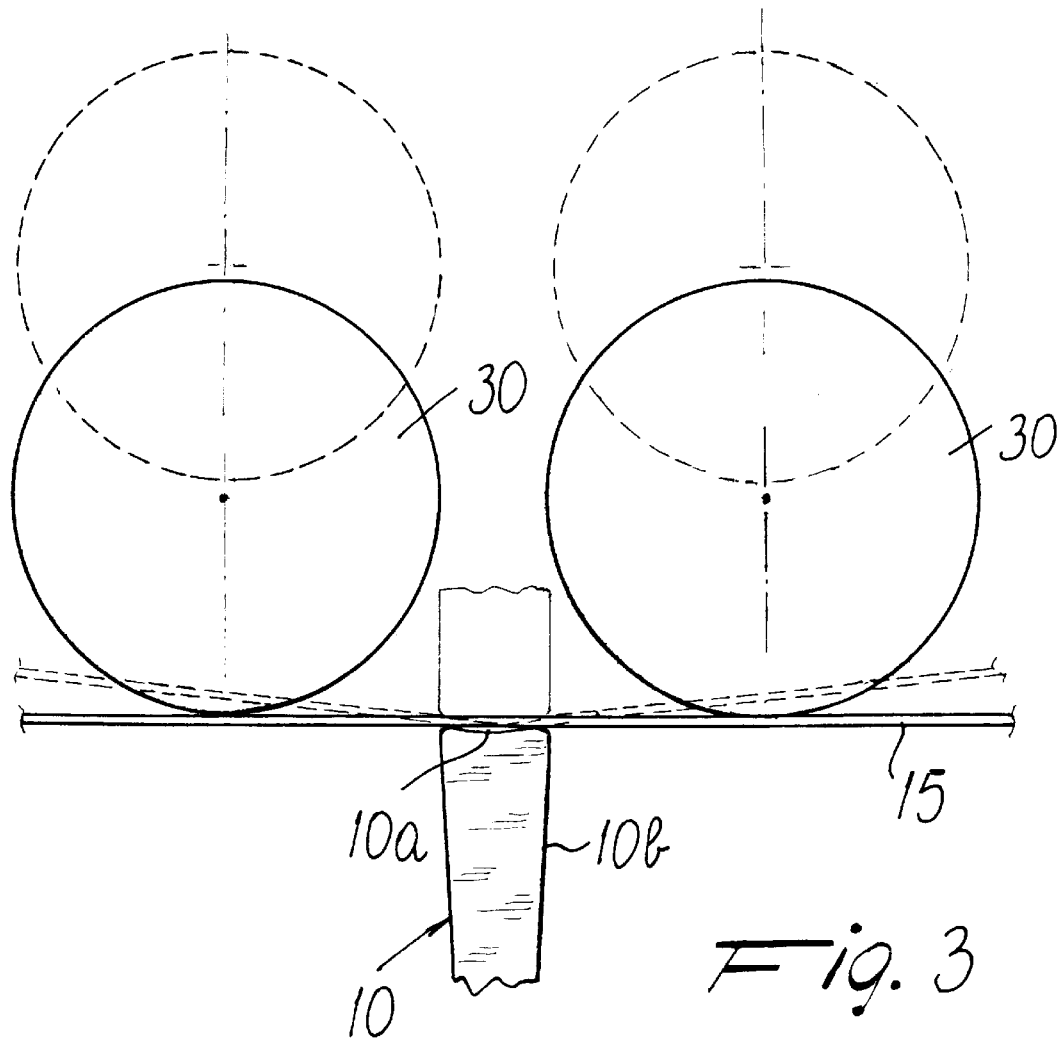
FIG. 3 is a schematic view of the initial step for the mutual engagement of the lamination and the bending roller.

During this step, the upper part 3 descends and the presser 20 engages the punch 10, which causes, as shown by the dashed lines in FIG. 3, a slight lifting of the lamination 12 owing to the hollow shape 10a of the end of the punch 10.

When descent begins, the bending rollers 30 engage the lamination 12 without mutual sliding, but the surface contact causes the rotation of the rollers 30 on the lamination 12, so that no damage occurs to the surface of the lamination 12 during bending.

Figure 4:
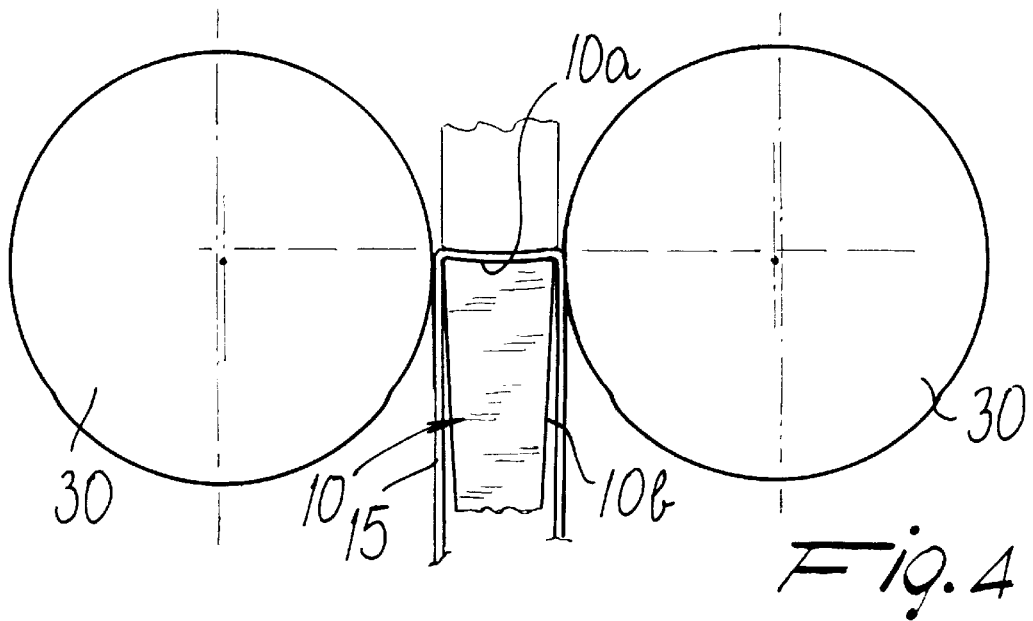
FIG. 4 is a view of the intermediate bending step performed by lowering the bending roller together with the upper part.
Figure 5:
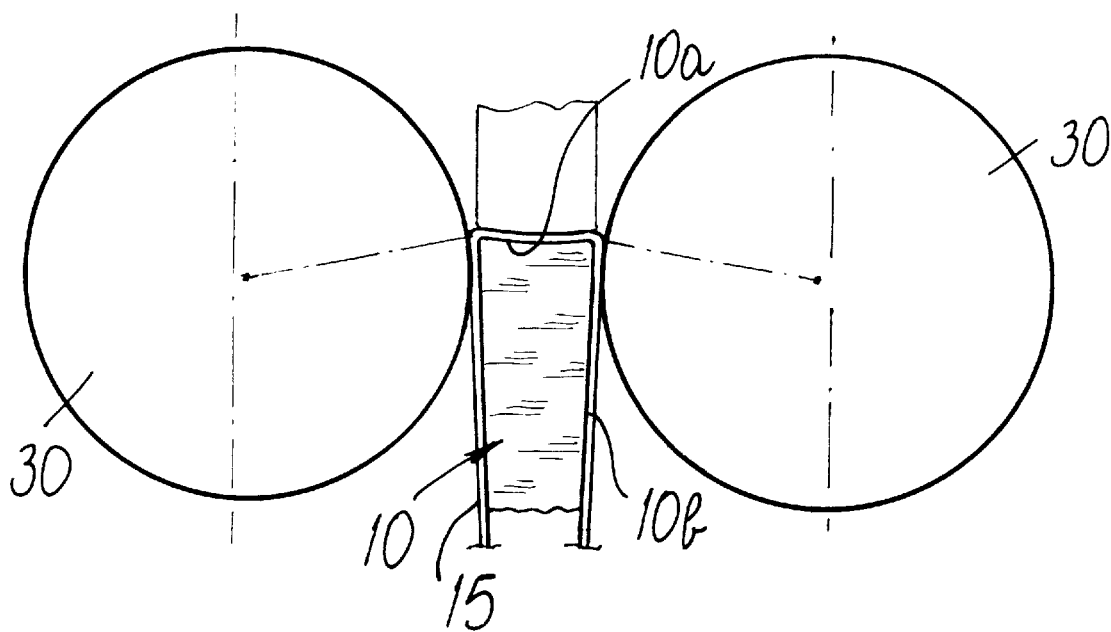
FIGS. 5 and 6 illustrate in succession the final bending step, performed with an oscillation of the support of the bending rollers.
Figure 6:
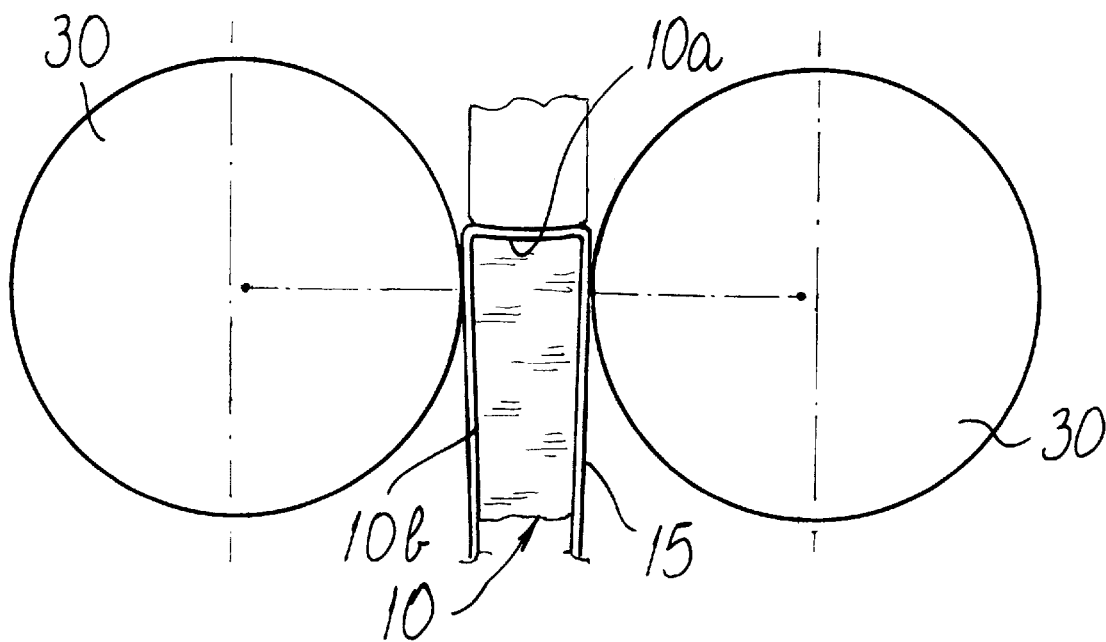

Once the initial bending step shown in FIG. 4 has ended, when an upper stop element 55 is approximately 4 mm from the lower stroke limit and therefore from a lower stop element 56 located on the base 2, the lateral cylinders 34 are actuated and rotate the bending rollers 30 about the fulcrum constituted by the point 32, with a consequent final bending action, shown in FIGS. 5 and 6, through more than 90° by means of the downward-tapering configuration, designated by the reference numeral 10b, of the punch 10; the bending by more than 90° has the purpose of compensating for the natural elastic return of the material and of allowing considerable pressure of the bending angles.

The extraction of the pistons of the lateral cylinders 34 causes the rotation, as mentioned, of the bending rollers 30, which by closing impart a lateral restriking thrust to the lamination 12 being bent, with a thrust which can be adjusted by setting the value of the pressure.

When the active stroke has ended, i.e., when the lower stroke limit is reached, the upper part 3 is lifted again and the two lateral cylinders 34 cause the retraction of the pistons, in practice spacing the bending rollers 30 mutually apart; the rollers 30 move away from the point of contact and disengage from the lamination 12, maintaining their position until the next bending operation.

For the sake of completeness in the above description, it should also be added that if sliding covers for diskettes are being manufactured, the presser includes a bending element, designated by the reference numeral 60, which bends the spring connecting lug.

From the above description it is thus evident that the invention achieves the intended aim and objects, and in particular the fact is stressed that there is provided an apparatus which allows to bend a lamination without producing surface damage to said lamination, since the bending roller, while it engages the lamination by contact, can rotate freely and accordingly no mutual sliding between the bending element and the lamination occurs This fact therefore allows to bend the lamination directly on the diskette assembly lines, consequently simplifying all the steps related to the application of the metallic sliding cover, which is typically U-shaped, since said sliding cover is produced directly in-line, starting from previously blanked laminations.

The invention thus conceived is susceptible of numerous modifications and variations, all of which are within the scope of the inventive concept.

All the details may also be replaced with other technically equivalent elements.

In practice, the materials employed, as well as the contingent shapes and dimensions, may be any according to requirements.

What is claimed is:

1. An apparatus for bending laminations and sliding covers for computer diskettes, comprising a forming die provided with a lower base and a movable upper part, said lower base constituting a forming punch and centering elements for positioning a lamination to be bent, said movable upper part supporting a presser which engages said forming punch in order to retain said lamination in position and at least one bending roller which engages a surface of said lamination without relative sliding in order to perform bending in abutment against said punch, said at least one bending roller being supported by side walls which are pivoted with respect to said movable upper part and are connected to blocks associated with lateral actuation cylinders.

2. The apparatus according to claim 1, wherein said lateral cylinders keep said bending rollers in a raised position during an initial bending step and act by pressing on said blocks when a lower stroke limit is approached, in order to perform a final bending step.

3. The apparatus according to claim 1, comprising, in said presser, a bending element for bending said lamination used to manufacture sliding covers for diskettes.

4. The apparatus according to claim 1, wherein said centering elements comprise retracting posts which move in contrast with springs accommodated in seats formed in said lower base of the die.

5. The apparatus according to claim 1, further comprising a central cylinder which acts on said presser in order to apply a constant pressure to all of the corresponding surface of the lamination in order to lock said surface against said forming punch.

6. The apparatus according to claim 1, wherein said at least one bending roller is freely rotatable about its own axis.

7. The apparatus according to claim 1, further comprising a doctor which acts on said at least one bending roller, a suction element being also provided in order to remove impurities.

8. The apparatus according to claim 1, wherein said movable upper part supports two mutually opposite bending rollers arranged on opposite sides of said forming punch.

9. The apparatus according to claim 1, wherein said forming punch has a hollow shaped end which is directed towards said presser.

10. The apparatus according to claim 1, wherein said punch has a downward-tapering configuration.

* * * * *